United States Patent
Stoiber et al.

[11] Patent Number: 6,065,338
[45] Date of Patent: May 23, 2000

[54] MACHINE FOR MACHINING WORKPIECES

[75] Inventors: Dietmar Stoiber, Grünwald; Siegfried Koepp, Mühltal; Michael Sienz, Overath, all of Germany

[73] Assignee: Siemens Linear Motor Systems GmbH & Co. KG, Munich, Germany

[21] Appl. No.: 09/077,783

[22] PCT Filed: Oct. 9, 1997

[86] PCT No.: PCT/EP97/05564

§ 371 Date: Jun. 5, 1998

§ 102(e) Date: Jun. 5, 1998

[87] PCT Pub. No.: WO98/15879

PCT Pub. Date: Apr. 16, 1998

[30] Foreign Application Priority Data

Oct. 9, 1996 [DE] Germany ............... 196 41 494

[51] Int. Cl.[7] .............. G01M 1/16; B23B 3/00; G05B 11/01
[52] U.S. Cl. ............... 73/462; 82/117; 318/560
[58] Field of Search ................. 73/462, 460, 66; 82/117, 118, 132, 133; 83/72, 73, 74, 76.1; 408/8, 9, 10, 11, 12, 13; 364/474.02; 318/561, 569, 570, 571, 572, 560; 29/27 C

[56] References Cited

U.S. PATENT DOCUMENTS

| | | | |
|---|---|---|---|
| 3,634,664 | 1/1972 | Valek | 318/561 |
| 4,087,890 | 5/1978 | Ishizuka et al. | 29/27 C |
| 4,562,392 | 12/1985 | Davis | 318/572 |
| 4,698,773 | 10/1987 | Jeppsson | 364/474.02 |
| 5,374,884 | 12/1994 | Koren | 318/632 |
| 5,493,763 | 2/1996 | Yamanaka et al. | 29/27 C |

FOREIGN PATENT DOCUMENTS

| | | |
|---|---|---|
| 0708 391 A2 | 10/1995 | European Pat. Off. |
| 1359066 | 7/1964 | France |
| 33 02 063 | 6/1986 | Germany |
| 39 31 143 | 3/1991 | Germany |
| 40 28 006 | 3/1992 | Germany |
| 39 17 933 | 7/1993 | Germany |
| 196 30 694 | 9/1997 | Germany |

OTHER PUBLICATIONS

Li C J Et al: "To Improve Workpiece Roundness in Precision Diamond Turning By In Situ Measurement and Repetitive Control" Mechatronics, vol. 6, No. 5, Aug. 1, 1996, pp. 523–525 XP000592002.

Jan Linnebüger et al: "Rechnerische Korrektur von Fehlern bei mehrachsigen Fräsmaschinen" In: Technische Rundschau, Issue 36, 1993, pp. 54–57.

*Primary Examiner*—Richard A. Moller
*Attorney, Agent, or Firm*—Henry M. Feiereisen

[57] ABSTRACT

The invention relates to a machine for machining workpieces, for example a milling machine or a lathe, including imbalance sensors (60) for determining the imbalance of a rotary element, i.e. the cutter head (40) or of the workpiece (10) to be worked on. The advancement of the workpiece (10) relative to the tool (40) is so corrected in dependence on signals of the imbalance sensors (60) that a possible imbalance deflection of the tool (40) can be compensated. Correspondingly, the tool feed can be so controlled in a lathe in dependence on the rotation angle position and the determined imbalance that balancing can be carried out during or directly after treatment of an imbalance.

14 Claims, 2 Drawing Sheets

MACHINE FOR MACHINING WORKPIECES

BACKGROUND OF THE INVENTION

The invention relates to a machine for machining workpieces including a rotary drive with a mounting for a rotary element, namely a tool or a workpiece, and at least a feed drive for converting a relative movement between tool and workpiece. The invention further relates to a compensation unit for such a machine as well as to a process for machining workpieces.

Such machines are for example milling machines with rotating cutter head, drilling machines, grinding machines and the like, but also lathes.

Heretofore, these machines are configured in the form of numerically controlled (CNC) automated manufacturing machines and attain a very high degree of precision as a consequence of the highly accurate mechanical configuration of the automated machine as well as the ingenious control and regulating methods that enable to mill even complicated structures by means of a relative small cutter head so that the need for a tool exchange is eliminated and the shut-down period of the automated manufacturing machine is thus reduced.

In order to meet the demanded high standard of quality, the production process requires to substantially prevent or eliminate all error sources that may impair the production result. One error source that may adversely affect the production process is for example the imbalance of a turning tool, such as cutter head, or of a turning workpiece such as a shaft being worked on, or the like.

For example, an imbalance of a turning cutter head may result, depending on the extent of the imbalance and the rotating speed, in a deflection of the cutter head in circumferential direction so that the cutter head exhibits a greater milling circumference as intended. Although this may be countered by employing highly-precise (balanced) cutter heads and by re-adjusting the mounting of the cutter head, the imbalance can, however, never be completely avoided. Furthermore, an imbalance of the cutter head or of the mounting may be caused by damages or wear, necessitating a premature replacement of the tool or a readjustment. Both procedures are relatively expensive and complicated.

Imbalances adversely affect also rotary workpieces. An imbalance of for example rapidly turning rotary bodies such as shafts or the like may lead to a premature wear of bearings. Typically, such structural elements are therefore subjected to a balancing procedure.

Such a balancing procedure is effected by clamping the rotary part in a balancing device and caused to rotate, with the size and position (rotational disposition) of possible imbalances being registered by imbalance sensors, e.g. force sensors on the bearing. Subsequently, the rotary part is decelerated, and material is either removed or applied at the location constituting the imbalance; It is also possible to compensate the imbalance by removing material at one site and depositing material on another site. These procedures are repeated, i.e. the rotary part is again rotated for determining any imbalance and subsequently decelerated for compensating the imbalance until the resultant imbalance falls below a tolerable limit. However, these treatment procedures, too, are complicated and time consuming.

SUMMARY OF THE INVENTION

It is thus the object of the invention to so provide a machine of the above-mentioned type as well as a respective process for machining workpieces as to enable a compensation of the possible imbalances of a rotary element in a simple manner.

This object is attained by a machine which includes at least one imbalance sensor for determining an imbalance of the turning rotary element, with the feed drive being controllable in dependence on the extent of the determined imbalance.

A novel and inventive process of machining a workpiece includes the steps of determining an imbalance of the rotary element, and controlling the relative movement in dependence on the determined imbalance.

A novel and inventive compensation unit for compensating an imbalance deflection of a rotating tool in a numerically controlled machine tool or the like, includes a connection for receiving signals of an imbalance sensor; a connection for receiving signals of a rotation angle sensor and/or rotating speed sensor; a memory for storing a reference table for imbalance deflection in dependence on imbalances and/or an approximation formula in the form of an algorithm; and a compensation computer for generating compensation data for a drive computer of the machine tool in dependence on the data of the reference table and/or approximation formula.

In a machine according to the invention, an imbalance sensor registers an imbalance of a rotating workpiece or a rotating tool, and the feed drive for effecting the relative movement between tool and workpiece is controlled in dependence on the imbalance. The imbalance is, for example, registered together with the rotational angular position of the rotary element in view of the imbalance force upon the mounting of the rotary element or in view of imbalance forces which cause a deformation of the rotary element, whereby an optical sensor or for example an induction sensor can be utilized.

In a numerically controlled machine with rotating tool, e.g. a cutter head, a predetermined positional control of the relative movement between the tool and the workpiece can thus be corrected by determination of the imbalance.

Since, as stated above, imbalances as a result of wear or damage can never be fully avoided, the invention thus proposes to register the imbalance and the associated "virtual enlargement" of the cutter head and to take it into account during the positional control. Unlike the prior art which attempts to minimize the imbalance through tool exchange or readjustment, the invention goes one step further by consciously presuming a "remaining imbalance" in the tool, causing a virtual enlargement of the tool. The machine is then so controlled as if a slightly bigger cutter head is utilized.

The inventive principle of the control mechanism for the advance in dependence of a determined imbalance, can also be employed very effectively in a lathe. Normally, the turning chisel of a lathe is slidingly supported with respect to the rotating workpiece, and sophisticated drive techniques, for example via linear motors, enable also a realization of very rapid shifts of the turning chisel, e.g. in eccentric lathes. Such a rapid feed drive for the turning chisel is now coupled, in accordance with the invention, with an imbalance sensor, and material is removed from the workpiece commensurate with the imbalance via the control mechanism of the advance, in dependence of the rotational disposition of the imbalance, so that the workpiece can be balanced already in the lathe. In this context, it is to be noted that the compensation of the imbalance does not require a deceleration of the workpiece; rather, the compensation is executed in the same movement state as the determination of the imbalance. The cumbersome balancing operation which requires a stoppage of the workpiece for treatment is thus omitted.

It is certainly also possible to apply the principle according to the invention in a pure balancing device.

In a preferred embodiment of the process in accordance with the invention, a reference table may be prepared one time, e.g. for each tool or each type of tool for indicating imbalance deflections ("virtual enlargement") in dependence of predetermined imbalances. This reference table can be determined once and for all and then stored e.g. in the working computer of a numerically controlled machine. At operation of the machine, the control refers to the reference table, and the respective imbalance deflection is retrieved for each imbalance detected by the imbalance sensor and taken into account during the positional control.

As deflections by imbalance are relatively small, the imbalance deflection should be made dependent linearly on the imbalance mass and quadratically on the rotating speed. It is thus possible to establish an approximation formula for the imbalance deflection in dependence on these parameters. Certainly, it is also possible to utilize a combination of an empirically prepared reference table together with an approximation algorithm, e.g. with the rotating speed as parameter.

A preferred embodiment of the invention includes a compensation unit for a numerically controlled machine tool with connections for the imbalance sensor, a rotation angle sensor and/or rotating speed sensor and a memory for storing the reference table and/or the algorithm for an approximation formula, with a compensation computer generating corrective signals for the positional control in the machine. Advantageously, this compensation unit can be utilized as interface card for the working computer of the machine tool, with the data and signal formats being respectively suited to the standard of the working computer.

BRIEFS DESCRIPTIONS OF THE DRAWINGS

Embodiments of the invention will now be described with reference to the accompanying drawing, in which.

DETAILED DESCRIPTION OF PREFERRED EMBODIMENTS

Figure 1:
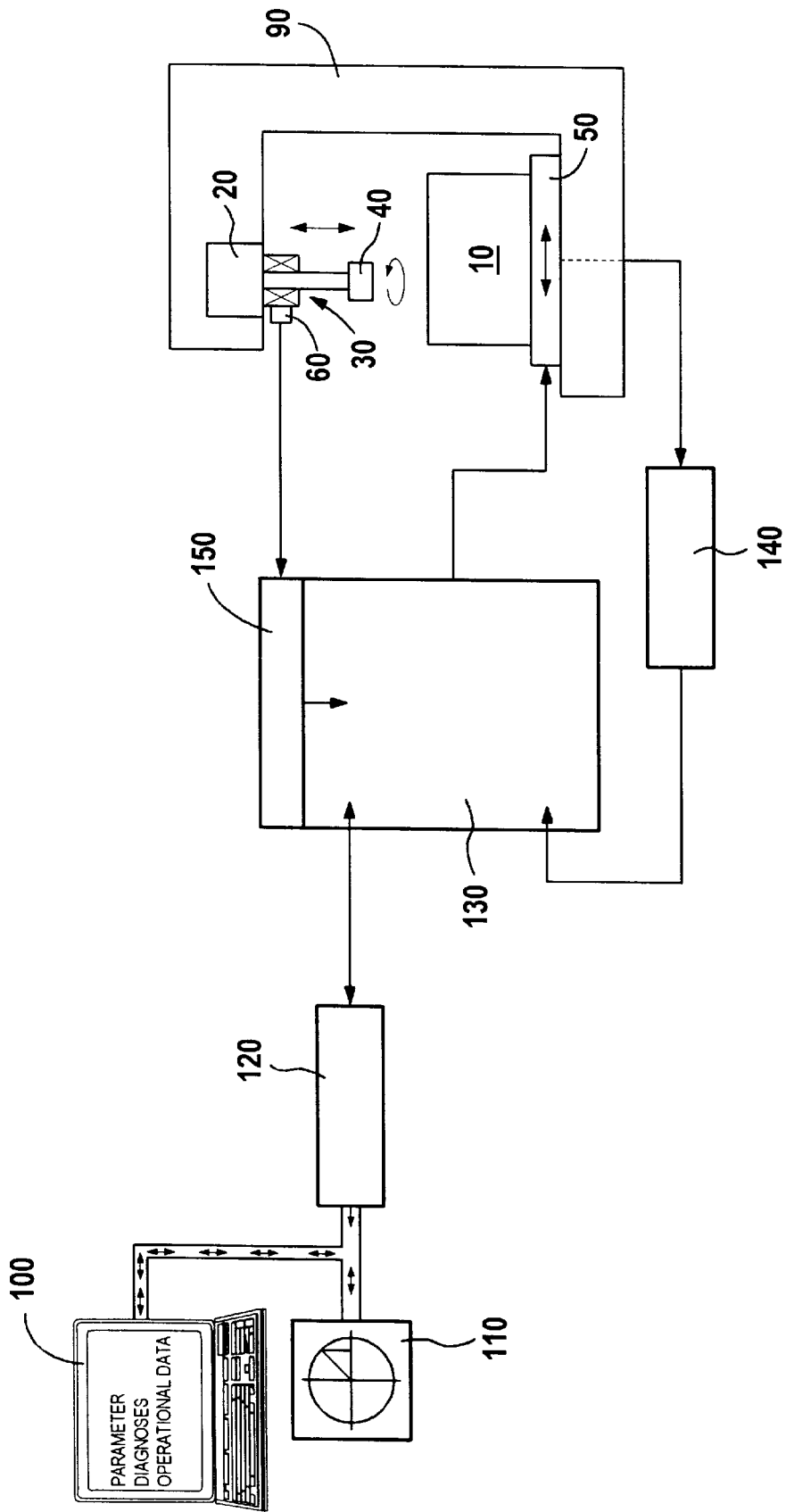
FIG. 1 is a schematic illustration of a numerically controlled automated milling machine.

According to FIG. 1, a numerically controlled milling machine includes a CNC-system comprised of an operational computer 100 and a data carrier 110. The operational computer 100 determines on the basis of the operational data positional control data commensurate with a desired control and transmits these data via an interface 120 to a drive computer 130. The drive computer 130 controls for example a linear drive 50 of the milling machine 90 for displacement of a workpiece 10. Positional data from a position sensor (not shown) are fed back via a further interface 140 to the drive computer 130. This serves essentially a closed loop control between desired value and actual value of the position, with detailed description of particulars of this closed loop control being omitted as this is generally known.

The milling machine 90 further includes a rotating cutter head 40 which is received in a mounting 30. An imbalance sensor 60 is associated to the mounting 30 and to a rotary drive 20 of the milling machine 90, respectively.

The imbalance sensor 60 measures for example the imbalance forces applied upon the mounting 30 and transmits corresponding signals to a compensation computer 150. The compensation computer evaluates the signals of the imbalance sensor 60 and transmits corresponding control signals to the drive computer 130 which in turn respectively corrects the positional control for the feed drive 50.

FIG. 1 depicts the compensation unit 150 separate from the drive computer 130; it is certainly possible to integrate the compensation unit 150 directly in the drive computer 130. Furthermore, it should be noted that the cutter head, too, could be designed moveably, as indicated by the double arrow next to the cutter head. Also, the feed drive 50 normally effects not only a linear motion in one direction, but also in one plane, i.e. also a movement perpendicular to the plane of projection of FIG. 1 represents a movement in feed direction.

All this movements should be understood as being a movement in feed direction, and all these movements can be corrected by the compensation computer 150 in view of the signals of the sensor 60. Also a rotating movement of the workpiece 10 relative to the cutter head for milling out a particular contour is to be understood as a feed movement.

Moreover, it will be appreciated that the use of the term "sensor" in singular may encompass also a sensor system comprised of several sensors.

Figure 2:
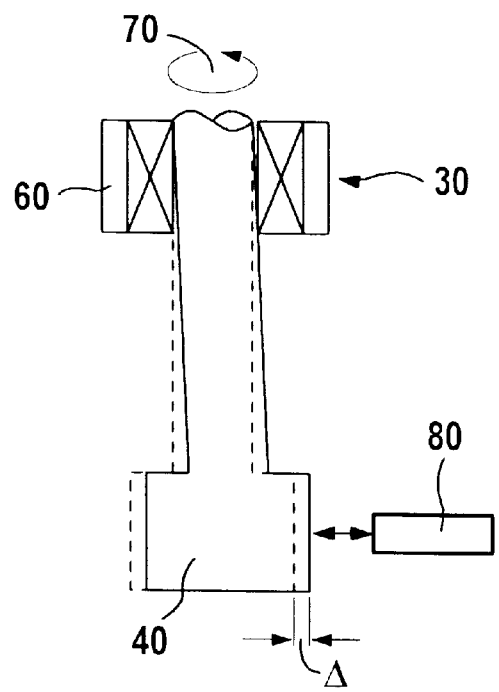
FIG. 2 is a schematic illustration for explanation of the imbalance deflection of a cutter head.

FIG. 2 shows a detail of the cutter head for explanation of the imbalance deflection. The cutter head 40 is clamped in the mounting 30 with a bearing or the like, and when not exhibiting any imbalance, the cutter head 40 occupies the position shown in broken lines. If, however, an imbalance exists, the cutter head is radially deflected by a imbalance deflection Δ, as depicted by the continuous line (only the deflection to the right is shown in FIG. 2; naturally this deflection exists also in all other radial direction when rotating the cutter head). The imbalance deflection Δ of the cutter head 40 is e.g. dependent on the extent of the imbalance (corresponding to the imbalance mass), the tool material, the tool shape and the rotating speed.

Preferably, the imbalance is measured by an imbalance sensor 60 at the bearing or the mounting 30 for the cutter head 40. A compensation computer then determines from the imbalance force and the rotating speed, determined by a rotation angle sensor or rotating speed sensor 70, the respective imbalance deflection Δ and compensates the positional control of the drive computer accordingly.

Furthermore, it is possible, to directly measure the imbalance deflection Δ which enlarges the "virtual radius" of the cutter head 40, for example through use of an optical sensor 80 or an induction sensor. In view of the limited space at the cutter head and in view of the unfavorable ambient conditions due to material chips, oil, smoke etc., the use of an imbalance sensor 60 on the mounting for measuring the forces is however preferred compared to the use of an optical sensor or an induction sensor 80.

Determination of the imbalance deflection Δ in dependence on the signals of the imbalance sensor 60 and the angle rotation sensor and/or speed sensor 70, respectively, can be carried out for example as follows.

In a test run, a precision tool is provided with a precisely defined imbalance, and the resultant imbalance deflection is determined. This imbalance deflection Δ can then be directly determined, e.g. by optical means, or through processing of a sample workpiece, whereby the deflection between the adjusted material removal and the additional material removal in view of the imbalance deflection can then be determined on the sample workpiece. This measurement is repeated for different, precisely defined imbalances, to thereby prepare a reference table. As described above, this reference table may also reflect rotating speeds etc. A further parameter that may impact on the imbalance deflection is for example the material being worked on; a relatively hard material results in a smaller imbalance deflection, a relatively compliant material possibly results in a greater imbalance.

Principally, there is also the possibility to indicate the function of the imbalance deflection in dependence of the rotating speed, the imbalance mass, the material etc. in the form of an approximation formula or to use a combination of reference table and approximation formula.

Figure 3:
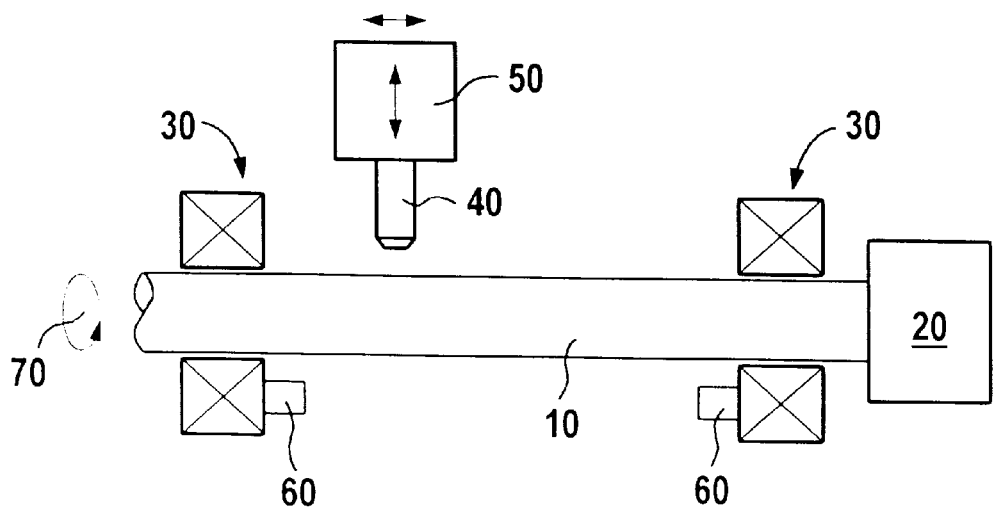
FIG. 3 is a schematic illustration of an automated lathe.

FIG. 3 shows schematically a lathe which has mountings 30 for clamping a shaft 10 being worked on. The shaft 10 is driven by a rotary drive 20, and the rotating speed and the rotational angle disposition are determined by a rotary sensor 70, which is shown only schematically. The shaft is worked on by a turning chisel 40 which is slidingly supported on a feed drive 50 (in the plane of projection of FIG. 3).

Imbalance sensors 60 are associated to the mounting s30 and bearings, respectively, of the lathe and determine the imbalance forces caused by the shaft. The position of the imbalance can be determined in a manner known per se by a computer on the basis of the data of the imbalance sensors and of the rotation angle sensor and/or rotating speed sensor. On the basis of the specific weight of the material being worked on, the size of the workpiece etc. and the sensor signals, the computer determines further the location and the amount of material removed by the turning chisel 40 in order to compensate for the imbalance.

The turning chisel 40 always approaches the workpiece 10 when the workpiece is in an area of rotational position that corresponds to the imbalance to be compensated, i.e. in the extreme case corresponding to the rotary frequency of the workpiece 10. Such a rapid advancement is currently possible without any problems for example by means of linear drives which already have been used in eccentric lathes.

Although the material removal is carried out in accordance with the present invention essentially at a same time as the determination of the imbalance, to thereby avoid unnecessary operations such as braking of the shaft etc., it should be emphasized however that the measurements and the approach of the turning chisel are preferably executed in a time-staggered fashion in order to substantially eliminate any impacts on the sensors through the chisel 40 of the operating force that acts on the shaft.

The configuration of the control mechanism for the lathe illustrated in FIG. 3 corresponds essentially to the configuration of FIG. 1, with the signals of the sensors 70 and 60 being respectively transmitted to a compensation computer which in this context may also be designated as imbalance computer. This computer 150 then controls the advancement 50 of the lathe in correspondence to the sensor signals and the preset signals of the operational computer 100 etc.

What is claimed is:

1. A balancing apparatus for machining a workpiece, comprising:

a rotary drive for rotating a workpiece, said rotary drive having a mounting for attachment of the workpiece;

a feed drive supporting a tool and moving the tool relative to the workpiece; and at least one imbalance sensor for determining an imbalance of the rotating workpiece, said feed drive being so controllable that the tool removes an amount of material from the workpiece in response to a determined extent and rotational position of the imbalance.

2. The apparatus of claim 1 wherein the imbalance sensor and the feed drive are so synchronized that the determination of the imbalance and the control of the feed drive are executed substantially at a same time.

3. The apparatus of claim 1, and further comprising a rotation sensor for determination of the rotation angle position of at least one of imbalance and rotating speed of the rotating workpiece.

4. The apparatus of claim 1 wherein the imbalance sensor registers an imbalance force on the mounting of the rotating workpiece.

5. The apparatus of claim 1 wherein the imbalance sensor registers deformations of the rotating workpiece as a result of imbalance forces.

6. The apparatus of claim 1 wherein the imbalance sensor is a member selected from the group consisting of optical sensor and induction sensor.

7. A lath for machining a workpiece, comprising:

a rotary drive for rotating a workpiece, said rotary drive having a mounting for attachment of the workpiece;

a feed drive supporting a turning chisel and moving the turning chisel relative to the workpiece; and at least one imbalance sensor for determining an imbalance of the rotating workpiece, said feed drive being so controllable as to correct a relative position between the workpiece and the turning chisel in dependence on the determined imbalance.

8. The apparatus of claim 7 wherein the imbalance sensor and the feed drive are so synchronized that the determination of the imbalance and the control of the feed drive are executed substantially at a same time.

9. The apparatus of claim 7, and further comprising a rotation sensor for determination of the rotation angle position of at least one of imbalance and rotating speed of the rotating workpiece.

10. The apparatus of claim 7 wherein the imbalance sensor registers an imbalance force on the mounting of the rotating workpiece.

11. A process of machining a workpiece, comprising the steps of:

rotating a workpiece;

moving a tool relative to the workpiece for balancing the rotating workpiece;

determining an imbalance of the rotating workpiece; and controlling the movement of the tool relative to the workpiece in dependence on the determined imbalance.

12. The process of claim 11 wherein said controlling step and said determining step are executed substantially at a same time.

13. The process of claim 11 wherein said determining step includes determining an imbalance deflection generated at a particular imbalance in a test run for the rotating workpiece, repeating this procedure for different imbalances, preparing at least one of a reference table and an approximation formula, and correcting during machining the movement of the tool relative to the workpiece on the basis of a momentary imbalance and the at least one of the approximation formula and the reference table.

14. The process of claim 13 wherein the rotating workpiece is rotated at a speed which is reflected as a further parameter in the at least one of the reference table and the approximation formula.

* * * * *